(12) United States Patent
Hemphill et al.

(10) Patent No.: US 9,090,986 B1
(45) Date of Patent: Jul. 28, 2015

(54) METHOD FOR MAKING ELECTRODE FOILS HAVING REDUCED PARTICLE DETACHMENT AND REDUCED LEAKAGE CURRENT

(71) Applicant: Pacesetter, Inc., Sunnyvale, CA (US)

(72) Inventors: Ralph Jason Hemphill, Pickens, SC (US); David R. Bowen, Taylors, SC (US); Troy L. McCurry, West Union, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 14/168,940

(22) Filed: Jan. 30, 2014

(51) Int. Cl.
| | |
|---|---|
| *B44C 1/22* | (2006.01) |
| *C25F 3/14* | (2006.01) |
| *C23F 1/00* | (2006.01) |
| *C23F 1/36* | (2006.01) |
| *H01G 9/055* | (2006.01) |
| *H01G 9/045* | (2006.01) |
| *H01G 9/00* | (2006.01) |

(52) U.S. Cl.
CPC . *C25F 3/14* (2013.01); *B44C 1/227* (2013.01); *C23F 1/00* (2013.01); *C23F 1/36* (2013.01); *H01G 9/00* (2013.01); *H01G 9/0029* (2013.01); *H01G 9/045* (2013.01); *H01G 9/055* (2013.01)

(58) Field of Classification Search
CPC ... B44C 1/227; B81B 2201/0128; C23F 1/20; C23F 1/36; H01G 9/055; H01G 9/045; H01G 9/00; H01G 9/0029
See application file for complete search history.

(56) References Cited

U.S. PATENT DOCUMENTS

| | | |
|---|---|---|
| 4,474,657 A | 10/1984 | Arora |
| 4,518,471 A | 5/1985 | Arora |
| 4,525,249 A | 6/1985 | Arora |
| 5,660,737 A | 8/1997 | Elias et al. |
| 5,715,133 A | 2/1998 | Harrington et al. |
| 6,736,956 B1 | 5/2004 | Hemphill et al. |
| 7,130,183 B1 | 10/2006 | Fayram |
| 7,196,899 B1 | 3/2007 | Feger et al. |
| 2006/0023400 A1* | 2/2006 | Sherwood ..................... 361/503 |
| 2013/0026048 A1 | 1/2013 | Bowen et al. |

* cited by examiner

*Primary Examiner* — Lan Vinh
*Assistant Examiner* — Jiong-Ping Lu
(74) *Attorney, Agent, or Firm* — Theresa A. Raymer (57) ABSTRACT

Electrode foils suitable for use in electrolytic capacitors, including those having multiple configurations, have improved strength, reduced brittleness, and increased capacitance compared to conventional anode foils for electrolytic capacitors. Exemplary methods of manufacturing an anode foil suitable for use in an electrolytic capacitor include forming a pattern of etch resist on a surface of a substrate; etching a first area of the surface substantially enclosed by the pattern and a second area in intervals between the pattern to form tunnels in first and second areas of the surface; and removing the resist material revealing a non-etched frame. The resist material may be deposited, for example, by ink-jet printing, stamping or screen printing. Additionally, an etch resist pattern may be used to form strength lines on the substrate surface.

19 Claims, 11 Drawing Sheets

Prior Art

FIG. 6

Prior Art

METHOD FOR MAKING ELECTRODE FOILS HAVING REDUCED PARTICLE DETACHMENT AND REDUCED LEAKAGE CURRENT

BACKGROUND

1. Field of the Invention

The present invention generally relates to electrode foils and, more particularly, to a method for making electrode foils suitable for use as anodes in electrolytic capacitors.

2. Related Art

Electrolytic capacitors are compact, high voltage energy storage devices used in a variety of applications including, for example, in implantable medical devices (IMDs) such as implantable cardioverter defibrillators (ICDs). An ICD is a medical device that is implanted in a patient to monitor electrical activity of the patient's heart and to deliver appropriate electrical and/or drug therapy, as required. ICDs include, for example, pacemakers, cardioverters, defibrillators, and the like.

ICDs conventionally use electrolytic capacitors because such capacitors have a high energy density and can withstand a relatively high voltage. ICDs typically use two electrolytic capacitors in series to achieve the desired high voltage for shock delivery. For example, an ICD can utilize two 250 to 500 volt electrolytic capacitors in series to achieve a voltage of 500 to 1,000 volts.

One type of electrolytic capacitor includes an etched aluminum foil anode, an aluminum foil or film cathode, and an interposed kraft paper or fabric gauze separator impregnated with a solvent-based liquid electrolyte. The electrolyte impregnated in the separator functions as the cathode in continuity with the cathode foil, while an oxide layer on the anode foil functions as the dielectric. The entire laminate may be rolled up into the form of a substantially cylindrical body, or wound roll that is held together with adhesive tape and is encased, with the aid of suitable insulation, in an aluminum tube or canister. Connections to the anode and the cathode are made via tabs. Alternative flat constructions for aluminum electrolytic capacitors are also known, composing a planar, layered, stack structure of electrode materials with separators interposed therebetween.

Such capacitors used in ICD applications must typically be able to store a relatively large amount of energy (e.g., approximately 10-100 joules). Because the capacitance of an electrolytic capacitor increases with the surface area of its electrodes, one way to increase capacitance is to increase electrode (e.g., anode) surface area. But smaller size devices are desired for implantable devices such as ICDs. So the challenge is to increase surface area of the electrodes without increasing the physical size of the resulting capacitor.

In ICDs, as in other applications where space is a critical design element, it is desirable to use capacitors with the greatest possible capacitance per unit volume. By electrolytically etching the foils that are used to form the anodes and cathodes of a capacitor, surface area can be increased without enlargement of the overall capacitor. As a result of this enlargement of the surface area, electrolytic capacitors can obtain a given capacity with a smaller volume than an electrolytic capacitor which utilizes a foil with a non-etched surface. Likewise, etched-foil capacitors of a given volume can obtain a higher capacitance compared to non-etched foil capacitors. Etching the foil increases the surface area of the foil by pitting an otherwise flat surface.

In a conventional electrolytic etching process, the surface area of a foil is increased by removing portions of the foil to create etch tunnels. The foil used for such etching is typically an etchable aluminum strip of high cubicity. The etch initiation and hence the gain or capacitance of the foil is the result of several variables, such as foil cubicity, thermal oxide on the foil, and the electrochemical reaction. As tunnel density (i.e., the number of tunnels per square centimeter) is increased, a corresponding enlargement of the overall surface area will occur. Larger surface area results in higher overall capacitance.

But etching comes at the cost of increased brittleness of the foil itself. In order to obtain high capacitance, foil material must be removed during the etching process to create the tunnels and increase the surface area. Additionally, a widening process may be used to open the tunnels to prevent clogging during later oxide formation. Both the etching and widening processes can remove as much as 50 to 60% of the foil material (e.g., aluminum) to create a desired etch degree of greater than 30 million tunnels per $cm^2$. After formation of oxide during an aging process, the foil becomes even more brittle. This creates problems during further processing of the foil and assembly of the capacitor.

For example, a series of etched anode foils may be formed from a single aluminum sheet. After etching and otherwise processing the sheet, each anode is punched out by use of a mechanical die into an anode shape to conform to the geometry of the capacitor case. The more aluminum that is removed during etching and widening, the more difficult the foil is to punch from the sheet without creating cracks and loose particles.

After the anodes are punched by the mechanical die, the anodes are interleaved with paper and cathode layers and are assembled into stacks. But the edges of the brittle anodes can contain burrs and attached particles. And the burrs and particles can penetrate the paper layers and cause short circuits between the anode and cathode foils, compromising the quality and life of the capacitor. High potential tests performed to check the stacks for short circuit conditions prior to final assembly have shown that failures (i.e., short circuits) can occur in as many as 5 to 10% of the capacitor stacks depending on the brittleness of the anode foil.

Additionally after the punching process, the newly created edges of the anodes has exposed aluminum without a high-quality oxide formed thereon. After the assembly of the anodes, paper, and cathodes into a case, the capacitor case is sealed and filled with an electrolyte. Next, the capacitors are put through an aging process that reforms oxide on the edges and on any exposed cracks in the anodes. The oxide formed from the aging process is not as high quality as the oxide formed during the formation process. And the higher the ratio of edge surface to anode surface, the higher the potential is for increased leakage current.

In fabricating anode foils for use in an electrolytic capacitor having a multiple anode stack configuration, a tab extending from each anode foil is connected to tabs of adjacent anode foils of the stack to electrically connect the anodes together in parallel. To facilitate the electrical connection (e.g., by welding), the tabs are left un-etched. This can be accomplished using a mechanical mask to mask the tabs, and any other areas where etching is not desired during the etching process. For example, U.S. Pat. No. 5,660,737 to Elias et al. discloses use of a mechanical mask. Without the non-etched tab areas, welds will not appropriately form the connections between the anodes in a stack configuration. But the foils are susceptible to cracking along the etch/non-etch transition edge during the welding process. This can result in a tab detaching in the event of extreme crack propagation.

Another problem with using a mechanical mask in manufacturing anode foils for electrolytic capacitors is that the process is tedious, requiring operator involvement for mask alignment. This leads to production inefficiency. Further, since different capacitor products have different anode shapes, unique tab etch masks must be maintained for each particular product model, and current density must be optimized for each etch mask. This again leads to cost inefficiency and recurring costs as new products with different anode shapes are introduced.

What is needed is a high capacity anode foil and method of making such anode foil that overcomes deficiencies of known systems and methods.

SUMMARY

Disclosed herein are methods to improve upon prior electrode formation techniques. A non-etched frame around the edge of an electrode may be created by applying an etch resist mask before the etching process. Capacity of the anode may be maximized by creating the proper balance between sufficient masking to prevent particle formation and cracking after die punching and over masking which would reduce the electrode capacitance significantly.

In one embodiment, a method for making an electrode comprises the steps of: forming an intermittent etch resist pattern on a surface of a substrate; etching a first area of the surface substantially enclosed by the intermittent etch resist pattern and a second area in intervals between the intermittent etch resist pattern to form tunnels in first and second areas of the surface; and removing the resist material revealing a non-etched intermittent frame. In some embodiments, forming the intermittent etch resist pattern may be accomplished by printing the resist material by ink-jet printing, stamping, or screen printing. In some embodiments, the intermittent pattern of resist material may be formed from a plurality of closely spaced, substantially parallel lines.

In one embodiment, a method of making an electrode is described via the following steps: forming, on a surface of a substrate, an intermittent etch resist pattern having mask elements separated by space intervals, wherein the etch resist pattern substantially outlines a peripheral edge of the electrode, defines a first area within the peripheral edge, and defines a second area including the space intervals of the etch resist pattern; etching the first area and the second area to form tunnels in the surface of the substrate in the first and second areas; and removing the resist material revealing a non-etched intermittent frame. The method may further include cutting the substrate at the peripheral edge to form the electrode, wherein the electrode has a non-etched intermittent frame at its peripheral edge.

Additionally disclosed herein is a method of making an electrode, including steps of: forming a first etch resist pattern on a surface of a substrate to substantially border a first area and cover a second area; forming a second etch resist pattern within the first area to follow a contour of the second area; etching the first area to form tunnels in the surface; and removing the first and second etch resist patterns revealing a non-etched second area and a non-etched pattern corresponding to the second etch resist pattern. In some embodiments, the second pattern of resist material is a line pattern to form strength lines proximal to the second area to prevent or reduce crack propagation.

Further features, as well as the structure and operation of various embodiments are described in detail below with reference to the accompanying drawings.

BRIEF DESCRIPTION OF THE DRAWINGS

The accompanying drawings are incorporated herein, form a part of the specification and, illustrate various embodiments. Together with the detailed description, the drawings further serve to explain the principles of and to enable a person skilled in the relevant art(s) to make and use the devices and methods presented herein.

The various embodiments will now be described with reference to the accompanying drawings. In the drawings, like reference numbers indicate identical, or functionally or structurally similar elements.

DETAILED DESCRIPTION

The following detailed description refers to the accompanying drawings that illustrate exemplary embodiments. Other embodiments are possible, and modifications may be made to the embodiments. Therefore, the following detailed description is not meant to limit. Rather, the scope of the invention is limited only by the appended claims.

Various embodiments enable low-cost, continuous, and automated etching processes suitable for the preparation of anode foils for capacitors. These processes typically have fewer steps or operations than conventional processes for the preparation of electrode foils for capacitors and various advantages described herein. For example, an etch mask resist may be formed onto a metal substrate to form a non-etched frame around the perimeter of an electrode or to otherwise strengthen a portion of the metal substrate (e.g., near a tab).

Figure 1:
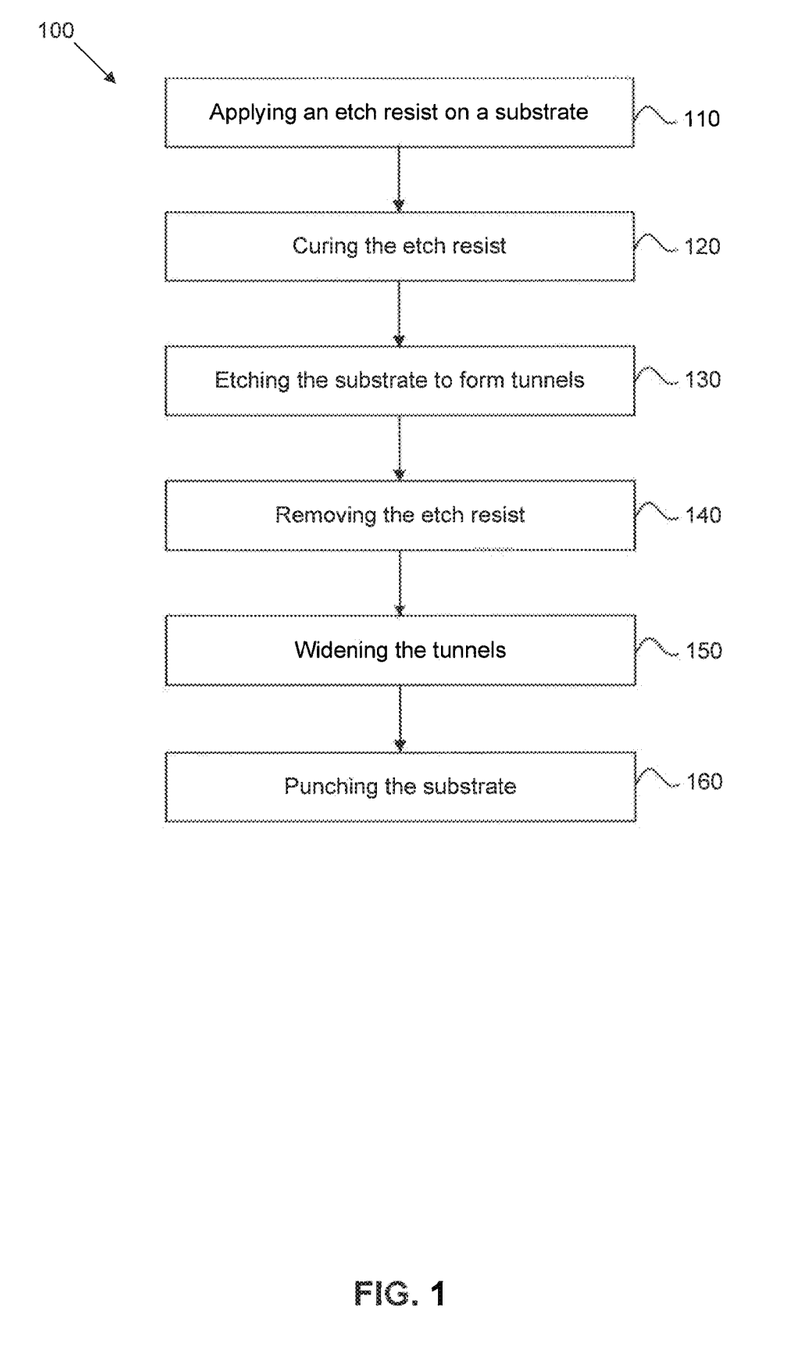
FIG. 1 is a flowchart of illustrating a process of manufacturing an electrode (e.g., an anode) according to an exemplary embodiment.

As depicted in FIG. 1, a series of steps may be performed to form an electrode for an electrolytic capacitor. FIG. 1 is a high level flowchart of an exemplary method 100 of manufacturing an electrode for an electrolytic capacitor. Method 100 may include a step 110 of applying an etch resist on the surface of a substrate. Method 100 may further include a step 120 of curing the etch resist. The etch resist is cured to form a etch resist mask on the surface of the substrate. After the etch resist mask is formed, the substrate is etched to form tunnels in the surface of the substrate at step 130 to increase the surface area of the substrate. A step 140 of removing the etch resist may then be performed to reveal the non-etched areas of the substrate. A step 150 of widening may be used to increase tunnel diameter and reduce brittleness at the interface between the etched and non-etched areas of the substrate. Finally, a step 160 of punching may be used to remove a portion of the substrate to form an electrode with etched and non-etched areas.

In some embodiments, method 100 of manufacturing an electrode for an electrolytic capacitor may be accomplished by the methods, apparatuses, and materials described in U.S. patent application Ser. No. 13/194,760 to Bowen et al., filed Jul. 29, 2011, and published as U.S. Patent Application Publication No, 2013/0026048, which is incorporated by reference herein.

Figure 2:
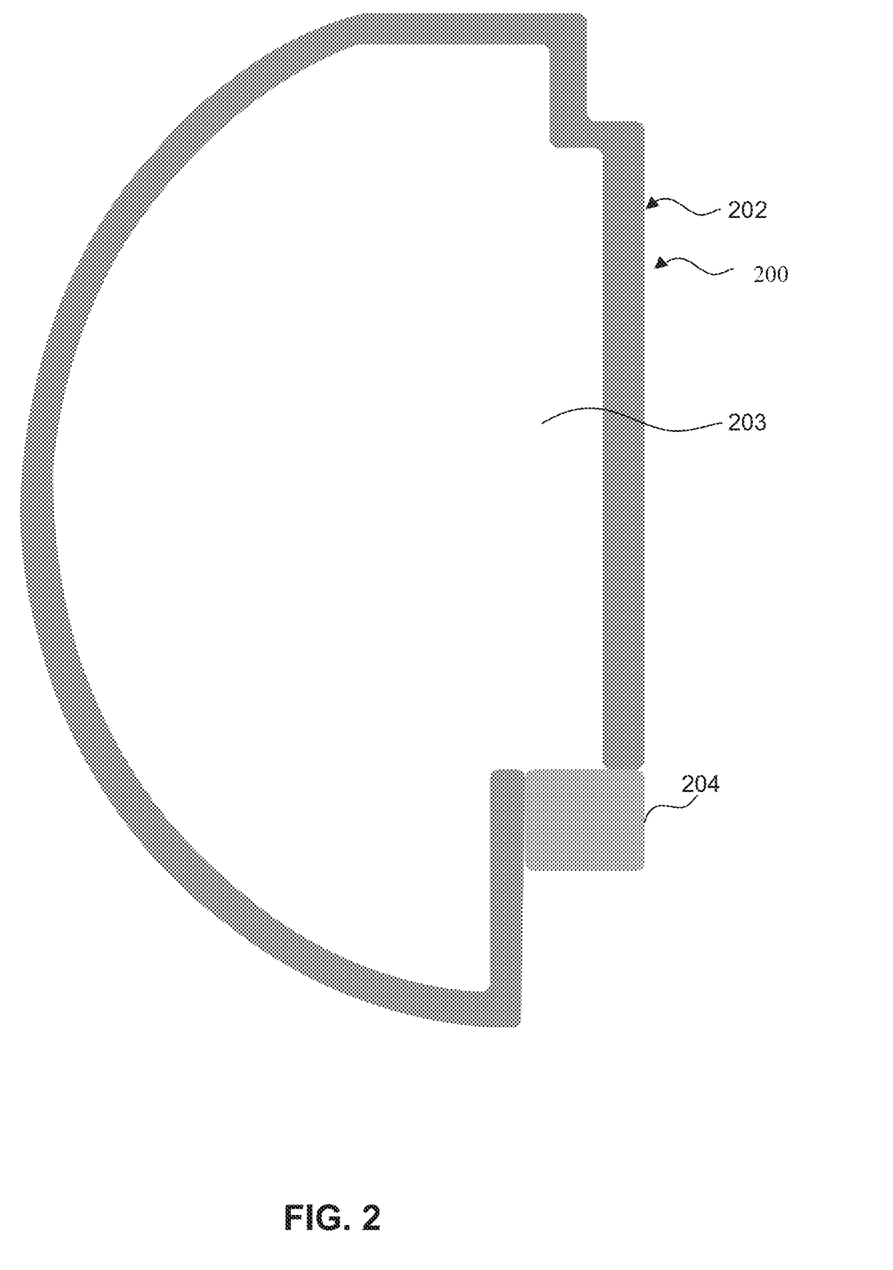
FIG. 2 shows an exemplary surface of a substrate after a step of applying an etch resist mask thereon.

FIG. 2 depicts an exemplary view of a metal substrate 200 having a surface 201 after forming an etch resist 202. Etch resist 202 is formed on a portion of an electrode area 203 according to a pattern. For example, in the embodiment depicted in FIG. 2, etch resist 202 is formed as a band at the peripheral edge of area 203. Etch resist 202 may additionally or alternatively mask a tab portion 204 of area 203. Such resists may be used to create non-etched areas of high strength and other areas of highly localized etching.

In alternative embodiments, adjacent portions of the substrate may have different predetermined patterns of resist disposed thereon by the process described herein. These different resist patterns can represent different products. Manufacturing different products is done without the manufacturing inefficiencies of conventional processes wherein a physical mask must be changed in order to change the resist pattern.

In some embodiments, substrate 200 may be in the form of a foil with thickness in the range of 85 to 125 microns, preferably 100 to 115 microns. In some embodiments, the etched foil resulting from the process may be used as an electrode in a capacitor, such as an anode or a cathode. As such, in some embodiments, substrate 200 can be a material typically used as an anode or cathode. Anode and cathode foils can be made of metal (for example, aluminum), metal alloy, or a metal composite material. Aluminum foils are well known in the art and are commercially available. In some embodiments, the foil is aluminum with purity of at least about 99.96%, preferably about 99.98-99.99%, aluminum and at least about 80% cubic texture. Alternative materials to aluminum include, but are not limited to, zinc, zirconium, tantalum, magnesium, niobium, and alloys of any or all of these metals.

Etch resist 202 may be a pattern printed, or otherwise formed, on surface 201 of metal substrate 200. Etch resist 202 may be disposed on substrate 200 by, for example, ink-jet printing, stamping, screen printing, or similar techniques. Ink-jet type delivery systems provide high resolution placement of the resist onto the substrate and are easily controlled with digital information that represents a desired pattern. Digitally controlling the resist pattern by downloading data to an ink-jet type dispenser allows a manufacturing line to quickly convert from the production of one product to another simply by transmitting new pattern data to the dispenser.

For example, etch resist 202 may be a liquid photoresist, for example, an ultraviolet-curable liquid polymer. A compatible etch resist is CircuitJet200, available from MacDermid, Inc. of Denver, Colo. This is a product primarily consisting of acrylic monomers, which can be cured to a protective polymer with 365 nm wavelength ultraviolet light, and has viscous properties compatible with commercial piezoelectric ink-jet technology. Commercially available flat-bed printers of the format manufactured by Orbotech, Inc., of Billerica. Mass., may be used. Those skilled in the art will recognize the well-known parameters for curing resist materials, and may determine appropriate wavelengths, intensities, and exposure times for a particular resist formulation without undue experimentation.

In the embodiment shown in FIG. 2, etch resist 202 is formed on surface 201 of substrate 200. Etch resist 202 prevents the perimeter of area 203 from being etched. Area 203 represents the bulk of substrate 200 which is to form an electrode. The protected perimeter of area 203 will come to form a non-etched frame for an electrode after punching of the electrode from the substrate sheet.

After step 110 of forming an etch resist on a substrate, a step 120 of curing the etch resist is performed. Exemplary method 100 includes applying a liquid resist material in the predetermined pattern as shown at step 110. Exposure to a light source polymerizes the exposed etch resist 202 to form etch resist mask.

After the etch resist mask is formed, the substrate is etched to form tunnels in the surface of the substrate at step 130 to increase the surface area of the substrate. Capacitance is increased by the surface area enhancing tunnels. In some embodiments, the surface area enhancing tunnels may be formed by an electrochemical etching process.

A metal foil can be etched according to any method that increases the surface area, such as electrochemical etching, pitting the foil surface mechanically and chemical etching. Electrochemical etching increases the surface area of the foil by electrochemically removing portions of the foil to create etch tunnels. Electrochemical etching is done according to any known etch process, such as the ones discussed in U.S. Pat. No. 4,474,657 to Arora; U.S. Pat. No. 4,518,471 to Arora; U.S. Pat. No. 4,525,249 to Arora and U.S. Pat. No. 5,715,133 to Harrington et al., each of which is incorporated herein by reference in its entirety.

Notably, direct application of etch resist 202 described above alleviates the need for a mechanical mask for the etching process. Direct application of etch resist 202 allows a greater portion of substrate 200 to be subjected to surface area enhancement. Since more of the surface area is available for enhancement, typically by tunnel formation, the electrode foils produced in accordance with the disclosure advantageously possess increased charge storage capacity per unit area of starting material.

Further, etch resist mask 202 reduces or prevents over-etching on the edges. A pattern of non-etched substrate at the perimeter of area 203 avoids the brittleness caused by over-etching. By creating a non-etched frame around the electrode edge, a smoother edge is obtained during the punching process. Fewer particles will detach and fewer burrs will be present around the edge because the foil is less brittle than an etched foil edge. Fewer particles and burrs on the edges reduces the possibility of paper penetration and, consequently, shorting between the cathode and anode electrodes in a capacitor stack. Hence, the quality of a capacitor is improved and yield losses are substantially reduced. Additionally, a smoother edge requires less oxide treatment due to less surface area on the edges of the electrodes.

Once etching step 130 is complete, etch resist 202 may be removed at step 140. In some embodiments, substrate 200 is baked or otherwise subject to thermal treatment. Etch resist 202 will decomposed to vapor and inert ash at a temperature and pressure sufficient to break down and oxidize the polymer film. Substrate 200 may be baked for an amount of time required for total decomposition of the volume of the etch resist 202. In embodiments using a resist material that includes acrylic monomers and ultraviolet photo initiators, baking step 140 is performed at a temperature, for example, in the range of about 550° C. to 625° C. until the photoresist chars or vaporizes.

Thermal removal of etch resist 202 obviates having to use a chemical developer that is conventionally required to selectively dilute and wash away an undesired resist after exposure, along with a rinsing step to remove the developer. The developer can adversely affect the etch process by either contaminating the substrate surface or undesirably modifying requisite thermal oxides for optimum etch performance metrics. Additionally, this process eliminates the cost due to the consumable developer chemistry, processing equipment, and chemical waste stream. Advantageously, little or no chemical waste is created by this embodiment.

After the etching process 130 and removal of the etch resist mask 140, a widening step 150 increases the diameter of the tunnels formed during the etching process and loosens/washes away remaining residue on the substrate surface. In some embodiments, an electrochemical widening process is performed in step 150. For example, polystyrenesulfonic acid (PSSA) may be used as a widening solution. Gains in sheet capacitance as great as about 12% may be achieved through widening. The use of PSSA in the widening solution advantageously reduces brittleness at the interface between the etched and non-etched areas of substrate 200. The use of PSSA also improves substrate strength at the transition between fully etched and non-etched areas by reducing the unwanted removal of aluminum at the high current density to low current density transition edge.

After widening step 150, the area 203 (including tab portion 204 and the non-etched frame) are removed from substrate 200 to form an electrode. In some embodiments, removal step 160 is accomplished by punching area 203 from substrate 200 through use of a die punch. In some embodiments, etch resist 202 is designed such that when anodes are punched from substrate 200 subsequent to the tunnel forming etch step 130, the edges of area 203 will contain a non-etched frame.

Figure 3A:
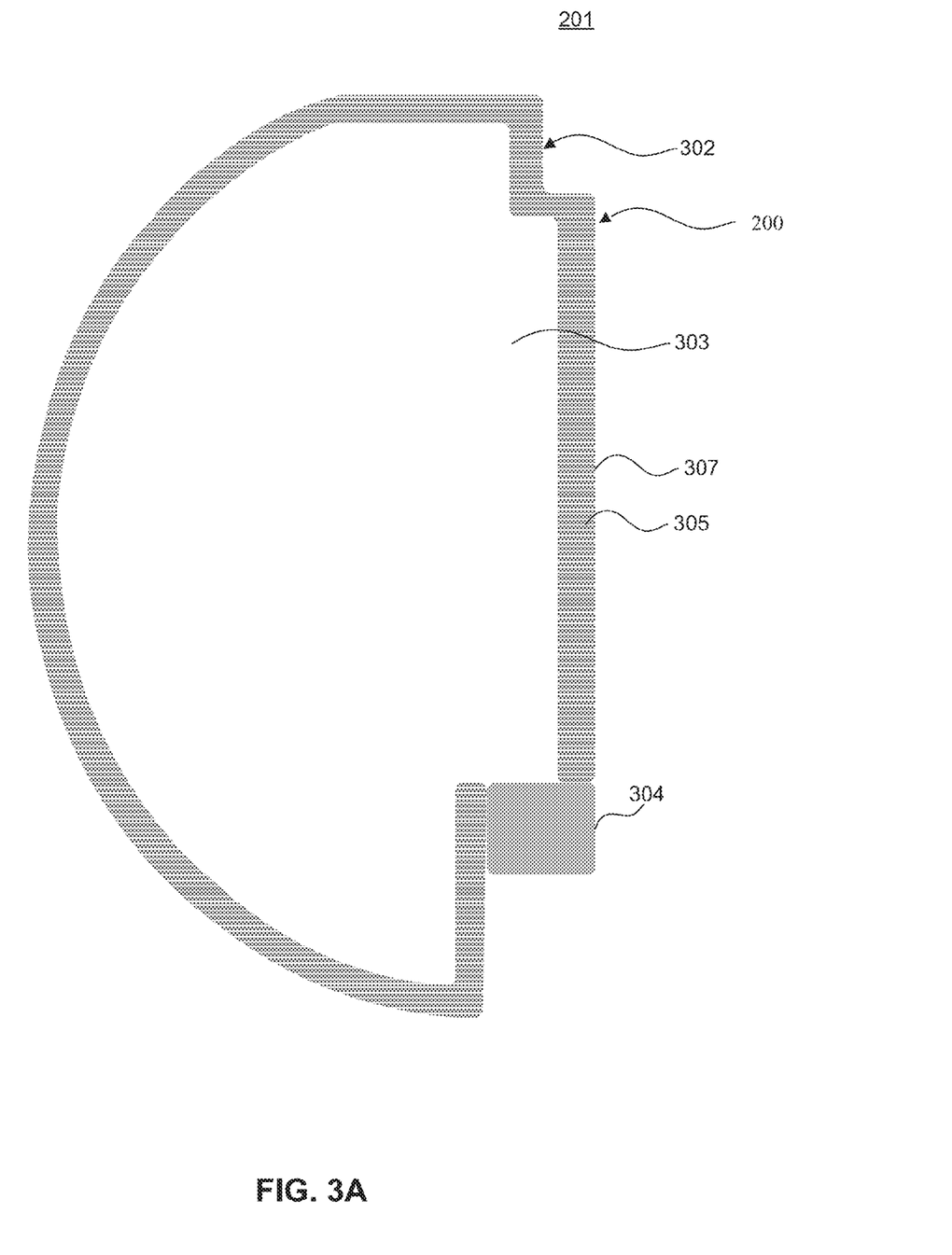
FIG. 3A shows an exemplary surface of a substrate after a step of applying an intermittent etch resist mask thereon.

FIG. 3A depicts an exemplary view of substrate 200 having surface 201 with an etch resist formed thereon in accordance with an alternate embodiment. In this embodiment, the etch resist is formed in an intermittent etch resist pattern 302. Unlike the solid pattern shown in FIG. 2, the intermittent pattern of FIG. 3A does not provide full coverage for the masked areas. Rather the intermittent pattern allows etching to occur in regions of the intermittent pattern. The intermittent pattern may be formed from mask elements (e.g., curved lines, straight lines, dots, or other geometric shapes) dispersed and spaced apart in a regular or irregular pattern. The elements may be disposed, for example, in a constant or varying density (e.g., dots per inch (DPI)), high density, low density, or a tapering (i.e., increasing or decreasing) density. A tapering density may be used as a transition from a masked area to an unmasked area to prevent cracks that might otherwise occur at the transition from an etched area to an unetched area. Further, the elements may be selected to have various sizes (e.g., widths for lines and diameters for dots) or even varying sizes within a single pattern. The term "intermittent pattern" is used herein to refer to an etch resist mask pattern formed from dots, lines, or other geometric shapes separated from one another by spacing (i.e., pitch) sufficient to allow etching to occur between and around the elements, but having elements with sufficient size to prevent etching of a portion of the substrate covered by an element.

Figure 3B:
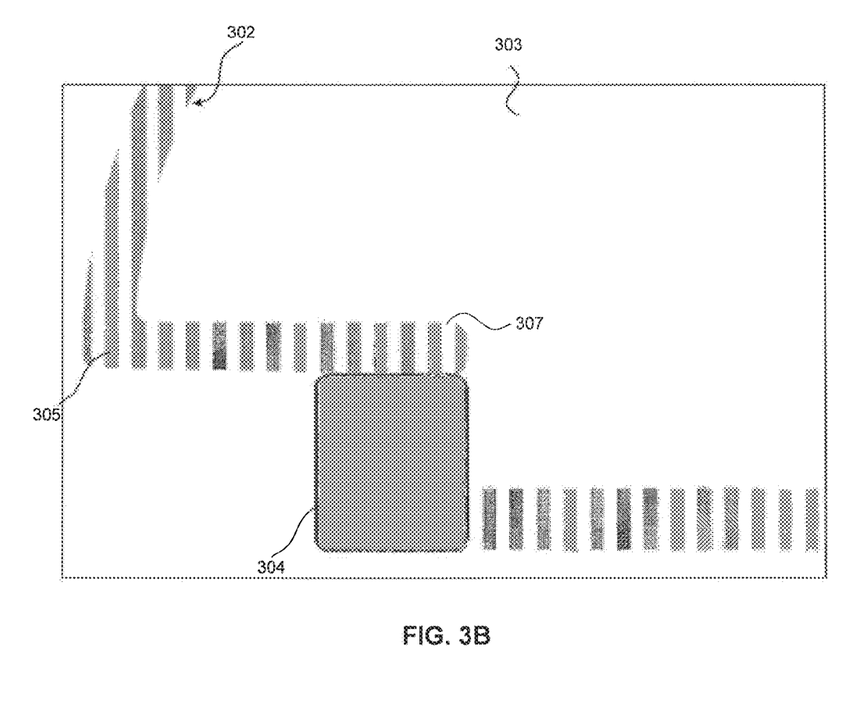
FIG. 3B is a magnified view of a portion of FIG. 3A, illustrating the intermittent pattern of the mask.

In the embodiment shown in FIG. 3A, intermittent pattern 302 includes spaced lines 305 and intervals 307 such that surface 201 is masked by lines 305 and unmasked in intervals 307 between lines 305. This configuration allows for tunnel formation in intervals 307 between lines 305 of intermittent pattern 302. In some embodiments, lines 307 may have an interval spacing generally between about 20 μm and 100 μm and a line width between about 20 μm and 100 μm. The line width and interval spacing may be the same distance or different. For example, lines 307 may have an interval spacing of about 25 μm and a line width of about 25 μm. In some embodiments, lines 305 are substantially parallel. FIG. 3B is a magnified view of a portion of FIG. 3A.

Figure 4:
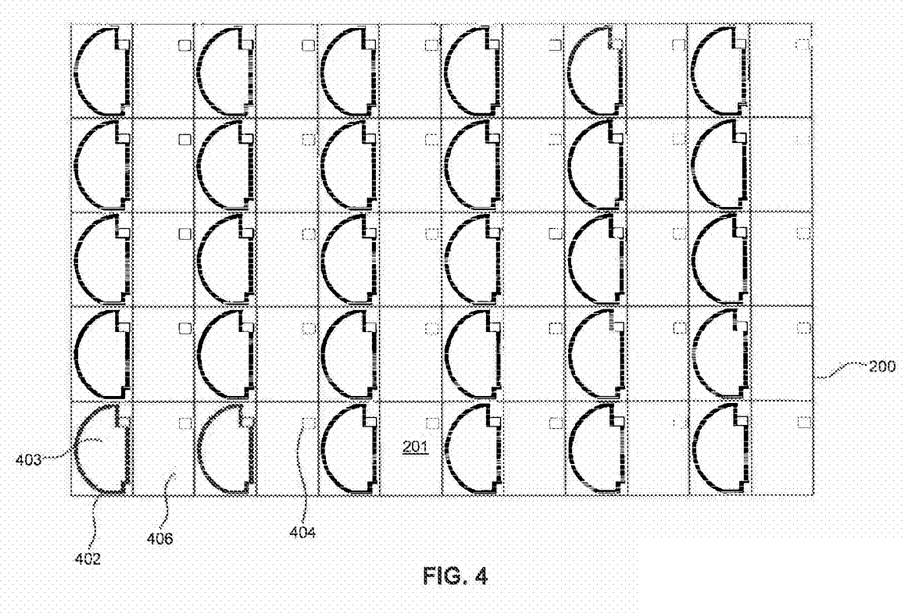
FIG. 4 shows an exemplary surface of a substrate after a step of applying a plurality of etch resist masks thereon.

FIG. 4 depicts an exemplary view of a substrate formed by the exemplary methods described above. A substrate 200 having a surface 201. A plurality of etch resist patterns 402 are formed on surface 201. Etch resist patterns 402 may be solid patterns as shown in FIG. 2 or an intermittent pattern as shown in FIGS. 3A and 3B. Etch resist patterns 402 may form a perimeter of an area 403 as described above with regard to FIG. 2 or 3A. Likewise, etch resist patterns 402 may include a tab portion 404. Substrate 200 may be a sheet with a plurality of regions 406. In some embodiments, each region 406 includes an etch resist pattern 402. As shown in FIG. 4, the regions may alternate between patterns 402 by region on a single side of substrate 200.

Though the masking described above is explained regarding a single surface, one of ordinary skill will appreciate that the process can be repeated, simultaneously or sequentially, on an opposing side of the metal substrate to maximize surface area on both sides of the substrate. The etch resist patterns 402 may alternate front to back for each electrode (e.g., anode) on a foil sheet.

In some embodiments, an etch resist pattern 402 is printed for every other region 406 on one side of a sheet. Etch resist patterns 402 may also be printed on the opposite side of the sheet for all regions 406 that do not have corresponding etch resist pattern 402 on the first side of the sheet. For example, an etch resist pattern 402 enclosing an area 403 and covering a tab portion 404 may be printed in one region 406. And an etch resist pattern 402 covering only tab portion 404 (such as shown in the rightmost column of regions 406 of substrate 200 in FIG. 4) may be printed in other regions 406, as shown in FIG. 4 by the alternating pattern of columns. The opposite may be done on the reverse side of substrate 200 so that only a tab portion 404 of a particular region 406 is masked from etching on both sides of the substrate sheet. This results in a substrate sheet having an etch resist pattern 402 enclosing an area 403 on only a single side for each region, while an etch resist pattern 402 covering tab portions 404 is produced on both sides.

During punching of the individual electrodes from the sheet material, a punch die is pressed through the sheet material from a first side. When the die punches through a region perimeter that is not masked, the sheet material (e.g., aluminum) tends to stick to and leave residue on the punch die. In contrast, when the die punches through a region perimeter that is masked, the masking material (e.g. aluminum oxide) tends to remove (e.g., by abrading) such residue from the die. Thus, alternating the side on which a masked electrode perimeter is deposited provides a benefits to the manufacturing process by reducing gumming or fouling of the die due to sheet material accumulated on the die during the punching process. The alternation helps to clean off the die each time the die punches a region with a masked electrode perimeter.

Additionally, this alternation creates less wear on the die and lowers maintenance and down time compared to the case where every region on one side of a sheet has a masked electrode perimeter.

More generally, by creating a non-etched frame around the edge of the punched electrode as exemplified by the embodiments of FIGS. 1-4, fewer particles will be present for detachment and fewer burrs will be present around the edge. As described above, the particles and burrs on the edges can cause shorting between cathodes and anodes. An appropriate etch resist pattern allows for minimal non-etched portions while still providing sufficient strength for the electrode in the desired areas. So a non-etched frame improves quality without significantly impacting capacitance. Additionally, the non-etched frame allows for less surface area to form during the aging process. Therefore, leakage current will be reduced in proportion to edge electrode surface area. The smoother edge surface also reduces the material and time needed to coat the edge with oxide. Thus, the aging process will be faster leading to higher productivity.

Figure 5:
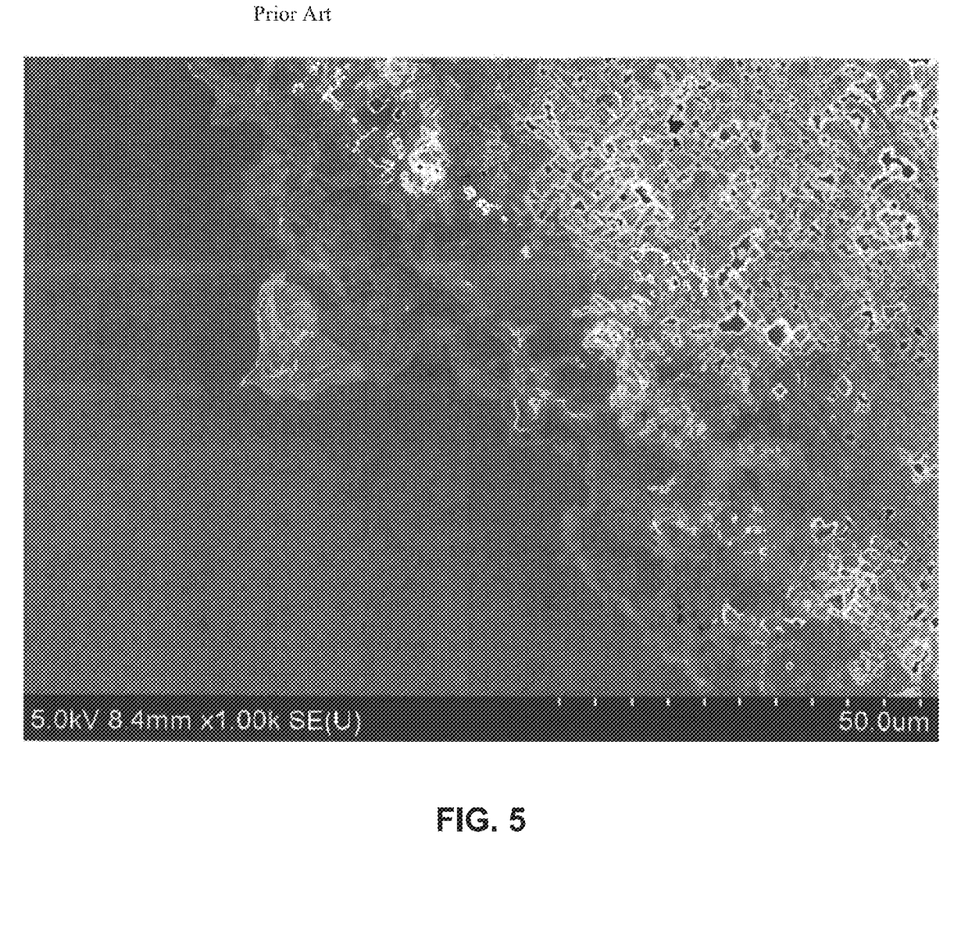
FIG. 5 shows a magnified view of an edge of an anode punched from a foil formed in accordance with a conventional technique.
Figure 6:
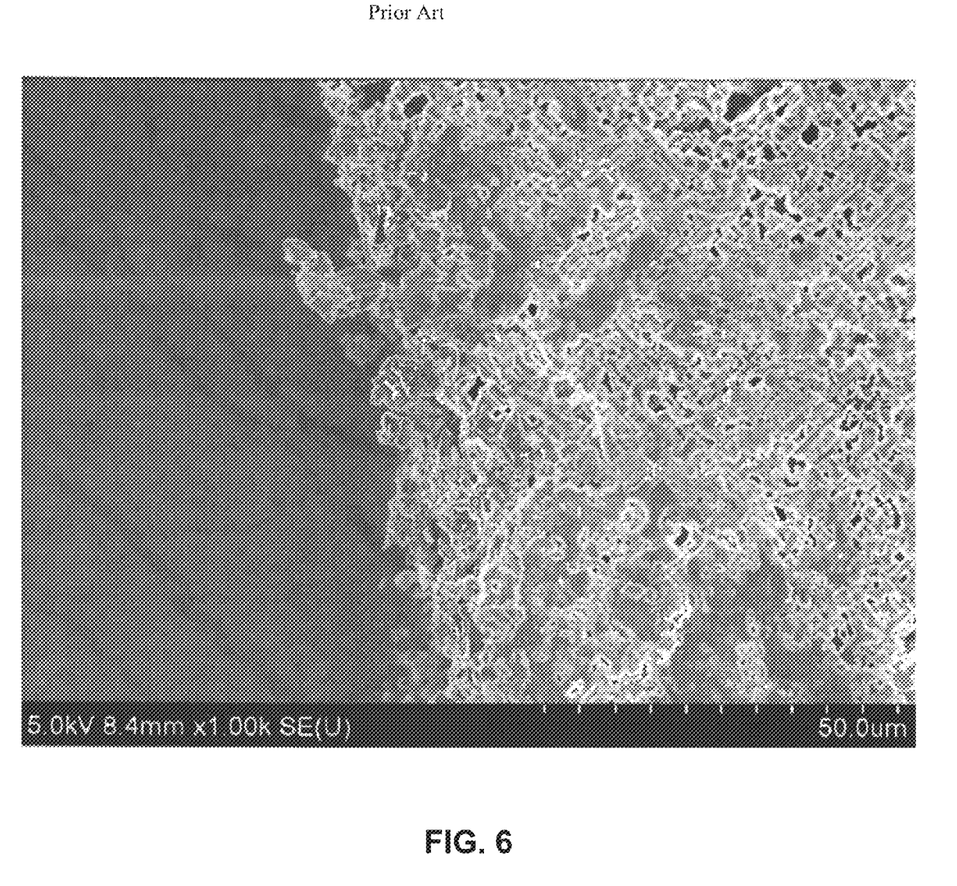
FIG. 6 shows a magnified view of an another edge of an anode punched from a foil formed in accordance with a conventional technique.
Figure 7:
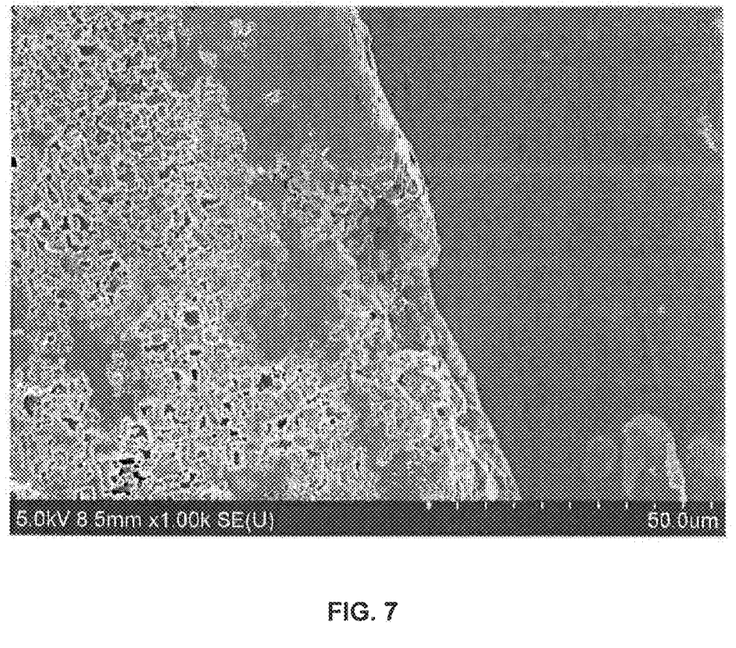
FIG. 7 shows a magnified view of an edge of an anode punched from a foil formed using an etch resist mask as described herein.
Figure 8:
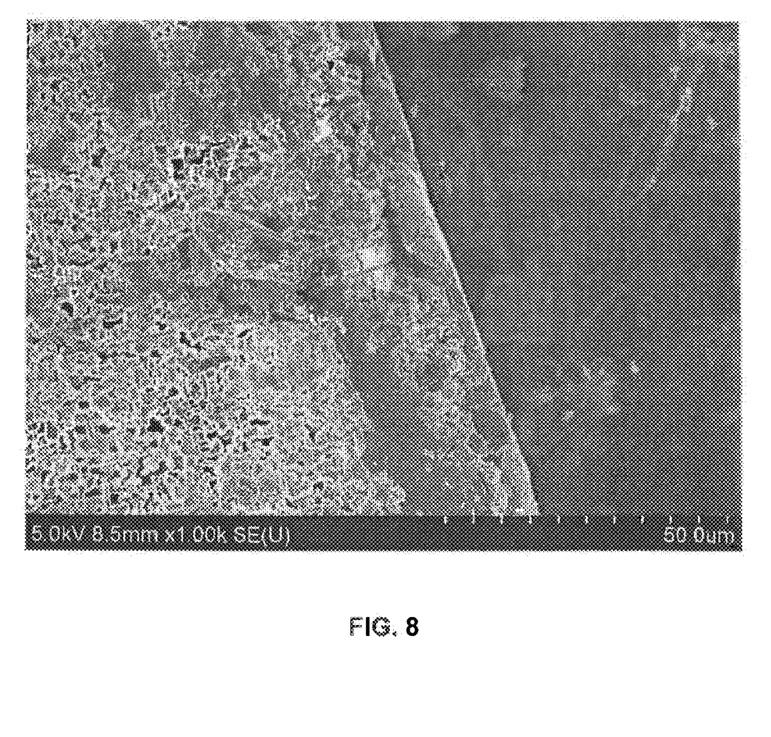
FIG. 8 shows a magnified view of an edge of an anode punched from a foil formed using an etch resist mask as described herein.

FIGS. 5 and 6 are micrographs showing the edge of electrodes punched according to a conventional method. By contrast, FIGS. 7 and 8 show the edge of electrodes punched from a foil that had a non-etched frame. As illustrated by these figures, the edges of the electrodes with the non-etched frame are cleaner and contains fewer particles. This reduces shorting paths when electrodes are assembled into capacitor stacks with paper between the electrode layers.

A test was conducted wherein electrode stacks were sealed into cases, impregnated with electrolyte, and aged. After seam weld, the capacitors were tested through a high voltage potential (hipot) test to check for shorts caused by particles punching through the paper during assembly. Two of sixteen capacitors tested from the control capacitors made in accordance with conventional methods failed the hipot test compared to zero failures with the non-etched framed foils. Additionally, the capacitors were tested for electrical properties such as leakage current, delivered energy, droop, and charge time. Results of the non-etched framed foil showed that leakage current was improved or reduced by 7.0%, droop was decreased by 4.5%, charge time was improved by 0.5% and, the delivered energy was about 1.3% higher compared to the control frameless foil.

In addition to the use of an etch resist mask described above to form a non-etched frame, a similar technique may be used for creating areas of increased strength at other places within the electrode. For example, an etch resist mask may be used to create strength lines near a tab of the electrode. The use of strength lines around the tab can prevent crack propagation or tab detachment during the tab welding process.

As discussed above, a tab portion that is conventionally masked can have a transition between etched and non-etched portions that creates an abrupt change in etch current density. For electrode foils prepared in accordance with the present disclosure, the etch current density can be leveled and made more consistent without causing brittleness at the interface between the etched and non-etched areas of the foil. The strength lines (i.e., of the intermittent pattern) help reduce the abruptness of the transitions from the etch to non-etch portions by "feathering" the etch current density. This advantageously provides higher foil capacitance per anode without compromising strength.

Figure 9:
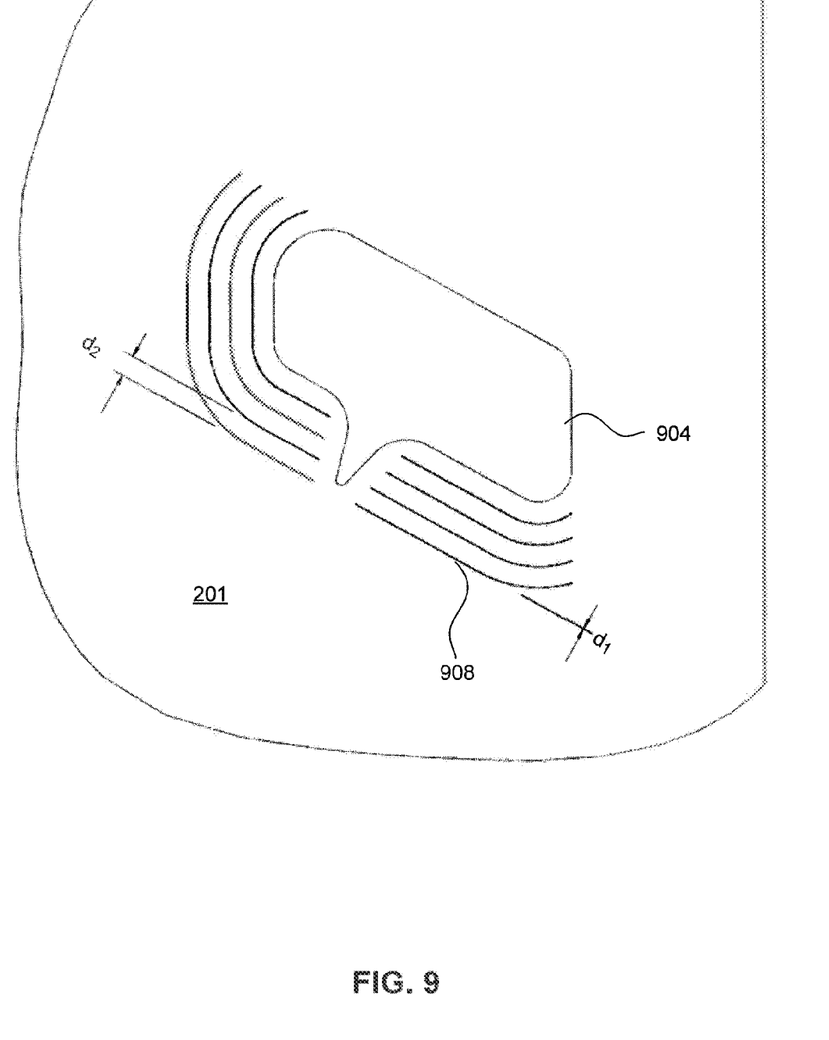
FIG. 9 is a diagram illustrating a substrate having a first etch resist pattern 904 covering a first area with a second etch resist pattern 908 formed adjacent to and shaped to follow a contour of the first area.
Figure 10:
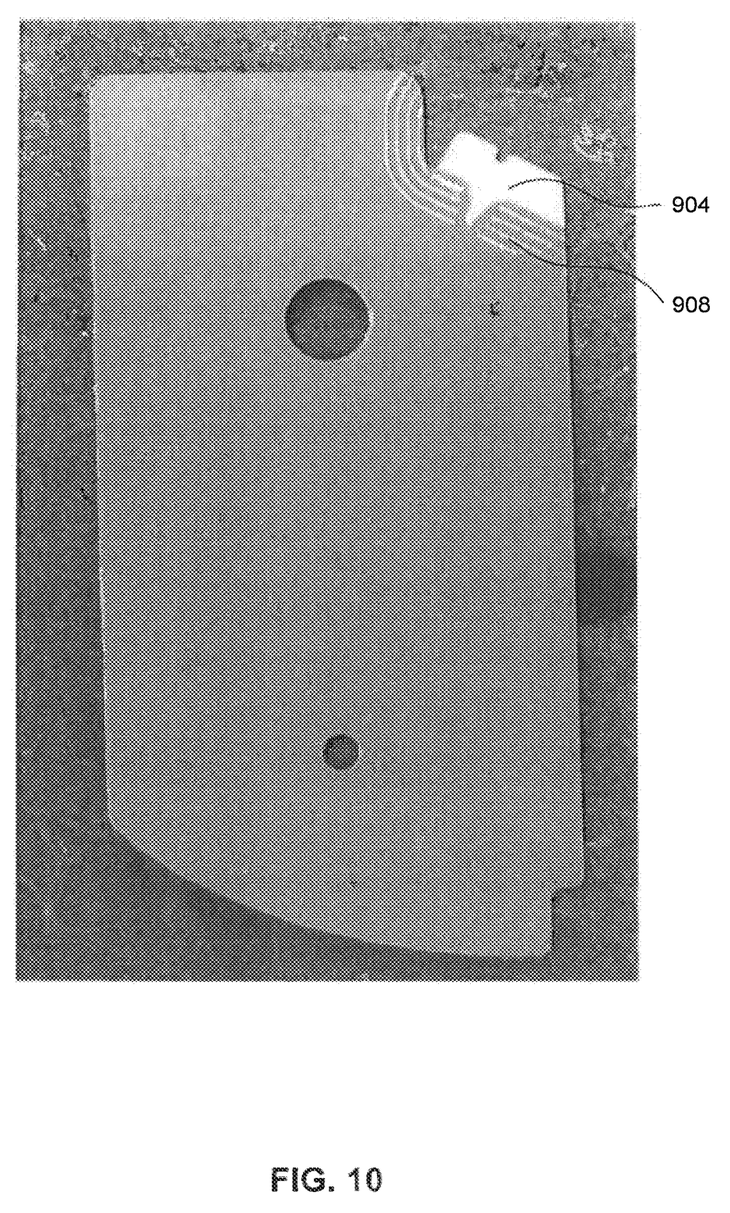
FIG. 10 shows an anode foil having the first and second areas with first and second etch resist patterns as shown in FIG. 9 after punching.

FIG. 9 depicts an exemplary embodiment of a substrate 200 having first etch resist pattern 904 covering a first area and a second etch resist pattern 908 in a second area following a contour of the first area. In some embodiments, the first area is a tab portion and etch resist pattern 908 includes a line pattern to form strength lines proximal to the tab portion to prevent or reduce crack propagation. The strength lines may have a thickness $d_1$ of about 25 µm and have a spacing $d_2$ of about 500 µm. The strength lines may be connected or unconnected and substantially parallel or nonparallel. In other embodiments, the strength lines have a thickness $d_1$, where $d_1$ is between about 20 µm to about 100 µm and a spacing $d_2$, where $d_2$ is between about 400 µm and about 1000 µm. FIG. 10 shows a photograph of an anode foil made in accordance with the disclosure herein. The electrode foil includes a tab portion 904 and strength lines 908.

A non-etched tab portion 904 may be shaped or patterned to create an area of increased strength at the transition between the etched foil area and a non-etched tab portion. During attachment of the electrodes to leads the tab portion is susceptible to cracking along the transition line. This susceptibility may be lessened by shaping the tab portion 904. Further, in the event of cracking the strength lines 908 may stop further propagation of the crack.

In accordance with the present disclosure, the intermittent patterned etch resist may be applied in different shapes and sizes to control and improve the amount of the etched area per anode foil. The patterned etch resist may be formed, for example, as one or more lines, dots, circles, polygons, or combinations thereof. The present invention is not limited to any particular layout of the intermittent patterned etch resist. Further, the intermittent patterned etch resist may be applied with a uniform density (e.g., element count per inch (such as DPI in the case of dots) or element size), a non-uniform density, or a varying density. For example, the density (e.g., element count or size) may be gradually reduced (i.e., tapered) to transition from a masked area to an unmasked area.

Electrolytic capacitors according to the present invention can be incorporated into various products using such capacitors, including, but not limited to implantable medical devices, such as implantable cardioverter defibrillators.

The techniques, materials and methods disclosed herein may be used, for example, to manufacture anodes, anode stacks and capacitors containing such anodes and anode stacks, such as those disclosed in U.S. Pat. No. 7,130,183 to Fayram and/or U.S. Pat. No. 7,196,899 to Feger et al., each of which are incorporated herein by reference.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents. While the invention has been particularly shown and described with reference to example embodiments thereof, it will be understood by those skilled in the art that various changes in form and details can be made therein without departing from the spirit and the scope the invention.

What is claimed is:

1. A method of making an electrode, comprising:
forming, on a surface of a substrate, an intermittent etch resist pattern having mask elements separated by space intervals, wherein the etch resist pattern substantially outlines a peripheral edge of the electrode, defines a first area within the peripheral edge, and defines a second area including the space intervals of the etch resist pattern, wherein the first area is substantially enclosed by the second area;
etching the first area and the second area to form tunnels in the surface of the substrate in the first and second areas; and
removing the resist material revealing a non-etched intermittent frame.

2. The method of claim 1, wherein the intermittent etch resist pattern comprises spaced lines.

3. The method of claim 2, wherein the lines have a spacing in the range of about 20 μm to about 100 μm.

4. The method of claim 2, wherein the lines have a width between about 20 μm to 100 μm.

5. The method of claim 2, wherein the intermittent etch resist pattern comprises substantially parallel lines.

6. The method of claim 1, further comprising:
cutting the substrate at the peripheral edge to form the electrode, wherein the electrode has a non-etched intermittent frame at its peripheral edge.

7. The method of claim 1, wherein forming the intermittent etch resist pattern comprises printing the resist material by ink-jet printing, stamping, or screen printing.

8. The method of claim 1, wherein the substrate comprises another surface on an opposing side of the substrate and the method further comprises:
forming another non-etched frame on the opposing side using another etch resist pattern.

9. A method of making an electrode, comprising:
forming a first etch resist pattern on a surface of a substrate to substantially enclose a first area and cover a second area;
forming a second etch resist pattern within the first area, adjacent to the second area, wherein the second etch resist pattern substantially matches a contour of the second area;
etching the first area to form tunnels in the surface; and
removing the first and second etch resist patterns revealing a non-etched second area and a non-etched pattern corresponding to the second etch resist pattern.

10. The method of claim 9, wherein the second etch resist pattern comprises a line pattern to form strength lines proximal to the second area to inhibit crack propagation.

11. The method of claim 10, wherein the strength lines have a thickness $d_1$, wherein $d_1$ is between about 20 μm to about 100 μm.

12. The method of claim 11, wherein the strength lines are unconnected.

13. The method of claim 12, wherein the strength lines are substantially parallel to one another.

14. The method of claim 13, wherein the strength lines have a spacing $d_2$, where $d_2$ is between about 400 μm and about 1000 μm.

15. The method of claim 9, wherein the second area comprises a tab portion.

16. The method of claim 9, wherein forming the first and second etch resist pattern comprises printing the resist material by ink-jet printing, stamping, or screen printing.

17. A method of making an electrode, comprising:
forming a first intermittent etch resist pattern on a surface of a substrate;
forming a second etch resist pattern on the surface of the substrate to substantially border a first area and cover a second area;
forming a third etch resist pattern within the first area to follow a contour of the second area;
etching a first area of the surface substantially enclosed by the first intermittent etch resist pattern and a third area in intervals between the intermittent etch resist pattern to form tunnels in first and third areas of the surface; and
removing the resist material to reveal a non-etched intermittent frame, a non-etched second area, and a non-etched pattern corresponding to the second etch resist pattern.

18. The method of claim 17, further comprising:
punching the substrate at the non-etched intermittent frame to form an electrode.

19. The method of claim 18, wherein each of the first intermittent pattern and the third etch resist pattern comprises spaced lines.

* * * * *